(12) United States Patent
Borchert

(10) Patent No.: US 7,579,722 B1
(45) Date of Patent: Aug. 25, 2009

(54) TORQUE HARNESSING ELECTRIC ENGINE

(76) Inventor: Sean Borchert, 11556 Lakeview Dr., Coral Springs, FL (US) 33071

( * ) Notice: Subject to any disclaimer, the term of this patent is extended or adjusted under 35 U.S.C. 154(b) by 379 days.

(21) Appl. No.: 11/504,907

(22) Filed: Aug. 16, 2006

Related U.S. Application Data

(60) Provisional application No. 60/708,730, filed on Aug. 16, 2005.

(51) Int. Cl.
*H02K 7/06* (2006.01)
(52) U.S. Cl. .......................... 310/24; 310/15
(58) Field of Classification Search ............ 310/23–24, 310/12, 14–15, 34, 35; 123/1 R
See application file for complete search history.

(56) References Cited

U.S. PATENT DOCUMENTS

| | | | |
|---|---|---|---|
| 2,338,005 A | 12/1943 | Morch | |
| 3,328,656 A | 6/1967 | Dotson | |
| 3,939,367 A | 2/1976 | Ramirez | |
| 4,317,058 A | 2/1982 | Blalock | |
| 4,345,174 A | 8/1982 | Angus | |
| 4,404,503 A | 9/1983 | Ward et al. | |
| 4,523,114 A | 6/1985 | Smith | |
| 4,749,893 A | 6/1988 | Reynolds | |
| 5,276,372 A | 1/1994 | Hammer | |
| 5,457,349 A * | 10/1995 | Gifford | 310/24 |
| 5,469,004 A * | 11/1995 | Jachim | 310/24 |
| 5,592,036 A | 1/1997 | Pino | |
| 6,049,146 A * | 4/2000 | Takara | 310/24 |
| 6,278,204 B1 * | 8/2001 | Frenette | 310/24 |
| 6,552,450 B2 | 4/2003 | Harty et al. | |

* cited by examiner

*Primary Examiner*—Michael C Zarroli
(74) *Attorney, Agent, or Firm*—David P. Lhota, Esq.; Malin Haley DiMaggio Bowen & Lhota, P.A.

(57) ABSTRACT

An electric engine having four drive mechanisms, four piston coil systems that fire ninety degrees (90°) apart and cause a previously fired piston coil system to return to its original position when another piston is subsequently fired and four crank systems, wherein each drive mechanism comprises a metallic T-yoke, ring-shaped magnet, metallic hollowed cylinder; each piston coil system comprises a wire coil, coil ring/slab and non-metallic spacer/coil-rod-connector; and each crank system comprises a drive rod, crank rod, guide plate/rod guide, guide plate housing, crank system housing, non-metallic gasket and crankshaft.

5 Claims, 15 Drawing Sheets

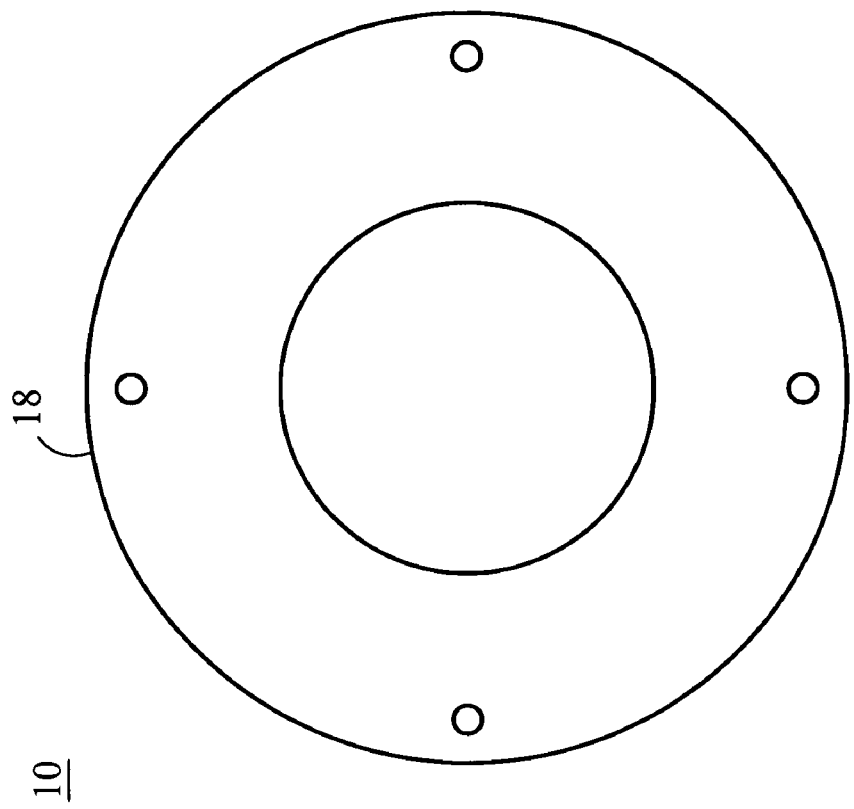
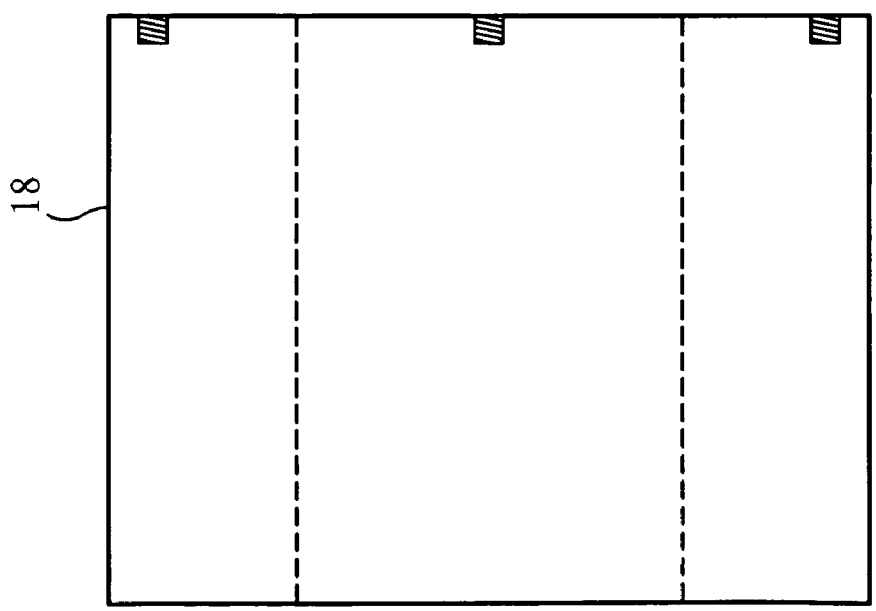
FIG. 8

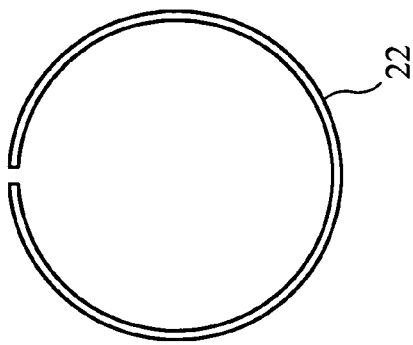
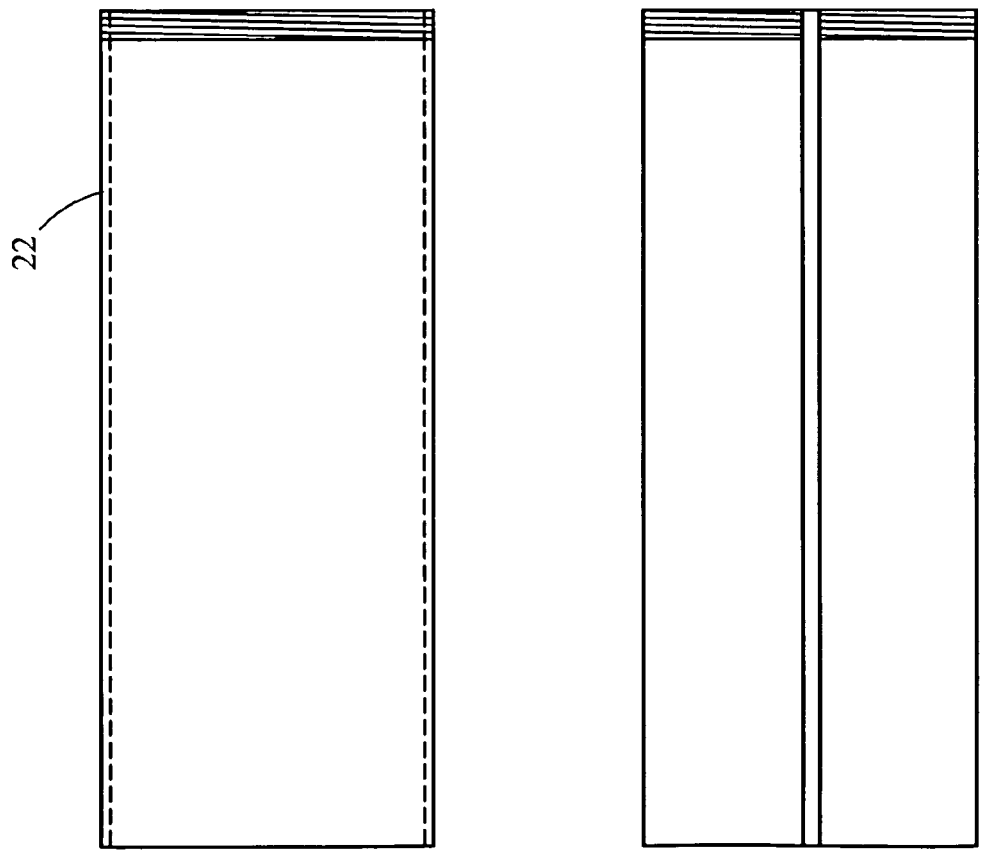
FIG. 9

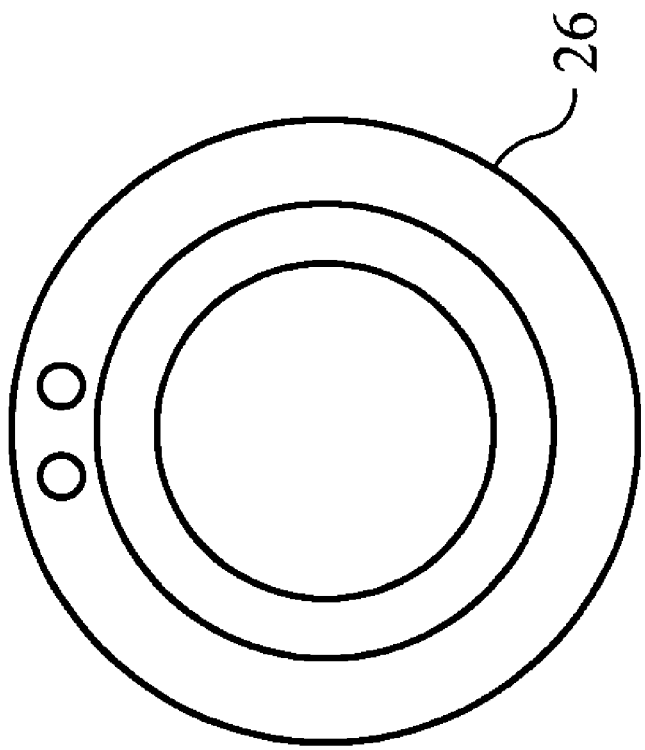
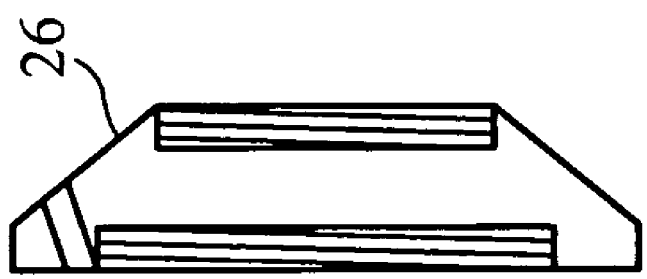
FIG. 10

TORQUE HARNESSING ELECTRIC ENGINE

CROSS REFERENCE TO RELATED APPLICATIONS

This application claims the benefit of provisional patent application Ser. No. 60/708,730 filed Aug. 16, 2005.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights rights whatsoever.

BACKGROUND OF THE INVENTION

1. Field of the Invention

This invention relates generally to an electric engine, and more particularly, to an electric engine having a torque bearing crankshaft that rotates in ninety degree (90°) increments to align and fire the pistons ninety degrees (90°) apart where only one piston fires at a time and uses the energy from the next piston fired to return to its resting position. The instant invention requires less power than other engines to produce the same output.

2. Description of the Background Art

Given the ongoing gas crisis, gasoline engines are becoming less desirable. Unfortunately, there are limited options. Electric engines provide an option but are not widely accepted because they typically require more power than other engines to produce the same output. One reason is that conventional electric engines only fire once every full cycle, i.e. 360°, making them highly inefficient without any benefit of increased power output. The most efficient torque is obtained at 90°, one-quarter cycle, however, there are no known electric engines that effectively and efficiently harness this torque without unacceptable loss in power output and efficiency. If an electric engine existed that fired pistons at 90° so as to capture the most efficient torque while increasing relative power output at acceptable efficiency levels, it would be well received.

Although a variety of electric engines are known in the art, they fail to adequately address or resolve the above noted issues of the prior art. For instance, U.S. Pat. No. 2,338,005, issued to Morch, discloses an electro-mechanical power plant for the generation, conversion and transmission of power. U.S. Pat. No. 3,328,656 issued to Dotson, discloses a reciprocating motor control system for motors having high Q solenoid coils. U.S. Pat. No. 3,328,656, issued to Dotson, discloses a reciprocating type of engine or motor having high Q solenoid coils. U.S. Pat. No. 3,939,367, issued to Ramirez, discloses a magnetically actuated assembly that may be mounted on a reciprocating engine to cycle at least one piston. U.S. Pat. No. 4,317,058, issued to Blalock, discloses an electro-magnetic reciprocating engine and method for converting an internal combustion engine to an electro-magnetic reciprocating engine wherein the cylinders are replaced with non-ferromagnetic material and the pistons reciprocally disposed therein are replaced with permanent magnet pistons. U.S. Pat. No. 4,345,174, issued to Angus, discloses an electromagnetic engine having an electromagnet or piston that operates within a cylinder having a stepped bore therein, wherein the cylinder reciprocates while the piston only pivots. U.S. Pat. No. 4,404,503, issued to Ward et al., discloses an electric motor having a piston coil that moves reciprocally with respect to one or more field coils. U.S. Pat. No. 4,523,114, issued to Smith, discloses a magnetic reciprocating motor that employs permanent magnets and electromagnets. U.S. Pat. No. 4,749,893, issued to Reynolds, discloses a magnetically actuated engine with a reciprocating piston slidingly mounted with a cylinder and connected to a rotatable shaft. U.S. Pat. No. 5,276,372, issued to Hammer, discloses a reciprocating electric motor having a crankshaft driven through connecting rods by piston-like reciprocating members powered by superconducting electromagnets. U.S. Pat. No. 5,457,349, issued to Gifford, discloses a reciprocating electromagnetic engine having reciprocating pistons with internally mounted magnets, slidingly mounted in a cylinder and connected to a rotatable crankshaft. U.S. Pat. No. 5,469,004, issued to Jachim, discloses an electric vehicle solenoid motor comprising a crankshaft disposed in a housing, at least one solenoid having a core operatively contacting the crankshaft; a power distribution control assembly disposed adjacent the crankshaft at the location of the protrusion; an electrical power source operatively connected to the solenoid so as to pass electric power through the power distribution control assembly to the solenoid; and wherein the power distribution control assembly has at least one power director disposed about the crankshaft. U.S. Pat. No. 5,592,036, issued to Pino, discloses a reciprocating piston attached to a rotating crankshaft with a permanent magnet, a cylinder confining the piston that has a head with an electromagnet located therein and a timed switching system that reverses the polarity of the electromagnet, thus alternately attracting and repelling the piston and driving the attached rotating crankshaft. U.S. Pat. No. 6,552,450, issued to Harty et al., discloses a reciprocating engine having at least one cylinder, at least one piston reciprocatingly movable in at least one cylinder, and reciprocatingly moving unit including magnet elements with at least one electromagnet connected with the cylinder and at least another electromagnet connected with the piston, so that when a polarity of the magnet elements is changed, a magnetic interaction of the electromagnets with one another causes the reciprocating movement of the piston. Pursuant to the foregoing, the prior art known fails to an electric engine having a torque bearing crankshaft that rotates in ninety degree (90°) increments to align and fire pistons ninety degree (90°) apart where only one piston fires at a time and uses the energy from the next piston fired to return to its resting position.

The foregoing patents and prior art fail to disclose the instant invention or adequately address the issues associated with conventional electric engines as contemplated by the instant invention. The instant invention addresses these unfulfilled needs in the prior art by providing such an electric engine as described herein.

BRIEF SUMMARY OF THE INVENTION

In light of the foregoing, it is an object of the present invention to provide an electric engine that uses the energy from a subsequently fired piston to return the previously fired piston to its resting position.

It is also an object of the instant invention to provide an electric engine that requires less power than other engines to produce the same output.

It is an additional object of the instant invention to provide an electric engine that harnesses torque on one-quarter cycles (i.e. 90°) without unacceptable loss in power output and efficiency.

It is another object of the instant invention to provide an electric engine having a torque bearing crankshaft that rotates in ninety degree (90°) increments to align and fire pistons ninety degrees (90°) apart.

It is a further object of the instant invention to provide an electric engine that fires pistons at ninety degrees (90°) to capture the most efficient torque while increasing relative power output at acceptable efficiency levels.

It is still another object of the instant invention to provide an electric engine having a piston coil system that does not require electricity to pull a piston back to its original position after firing.

It is still an additional object of the instant invention to provide an electric engine that does not need counter weights in the crankshaft.

It is yet another object of the instant invention to provide an electric engine that may be used to provide torque to axles or transmissions driven by the engine.

In light of these and other objects, the instant invention comprises an electric engine that requires less power than other engines to produce the same output by using the energy from a subsequently fired piston to return the previously fired piston to its resting position without unacceptable loss in power output and efficiency. The electric engine of the instant invention requires less power than other engines to produce the same output by harnessing torque on one-quarter cycles (i.e. 90°). The electric engine preferably comprises four drive mechanisms having a piston coil system that fire at ninety degrees (90°) apart as opposed to the conventional one hundred and eighty degrees (180°) or three hundred and sixty degrees (360°). The piston coil systems operate dependently, as opposed to independently, wherein the firing of one piston coil system causes the previous piston coil system to return to its original position. Consequently, the electric engine of the instant invention does not need counter weights in the crankshaft and requires less power for the same output. Although the instant invention is described with reference to four drive mechanisms, the electric engine may be adapted for use with more or less drive mechanisms.

In accordance with these and other objects, which will become apparent hereinafter, the instant invention will now be described with particular reference to the accompanying drawings.

BRIEF DESCRIPTION OF THE SEVERAL VIEWS OF THE DRAWINGS

FIG. 8 shows side and front elevational views of the preferred embodiment of the metallic hollowed cylinder of the electric engine in accordance with the instant invention.

FIG. 9 shows side, top and front elevational views of the preferred embodiment of the coil slab of the electric engine in accordance with the instant invention.

FIG. 10 shows side and front elevational views of the preferred embodiment of the non-metallic spacer/coil-slab-drive-rod connector of the electric engine in accordance with the instant invention.

DETAILED DESCRIPTION OF THE INVENTION

Figure 1:
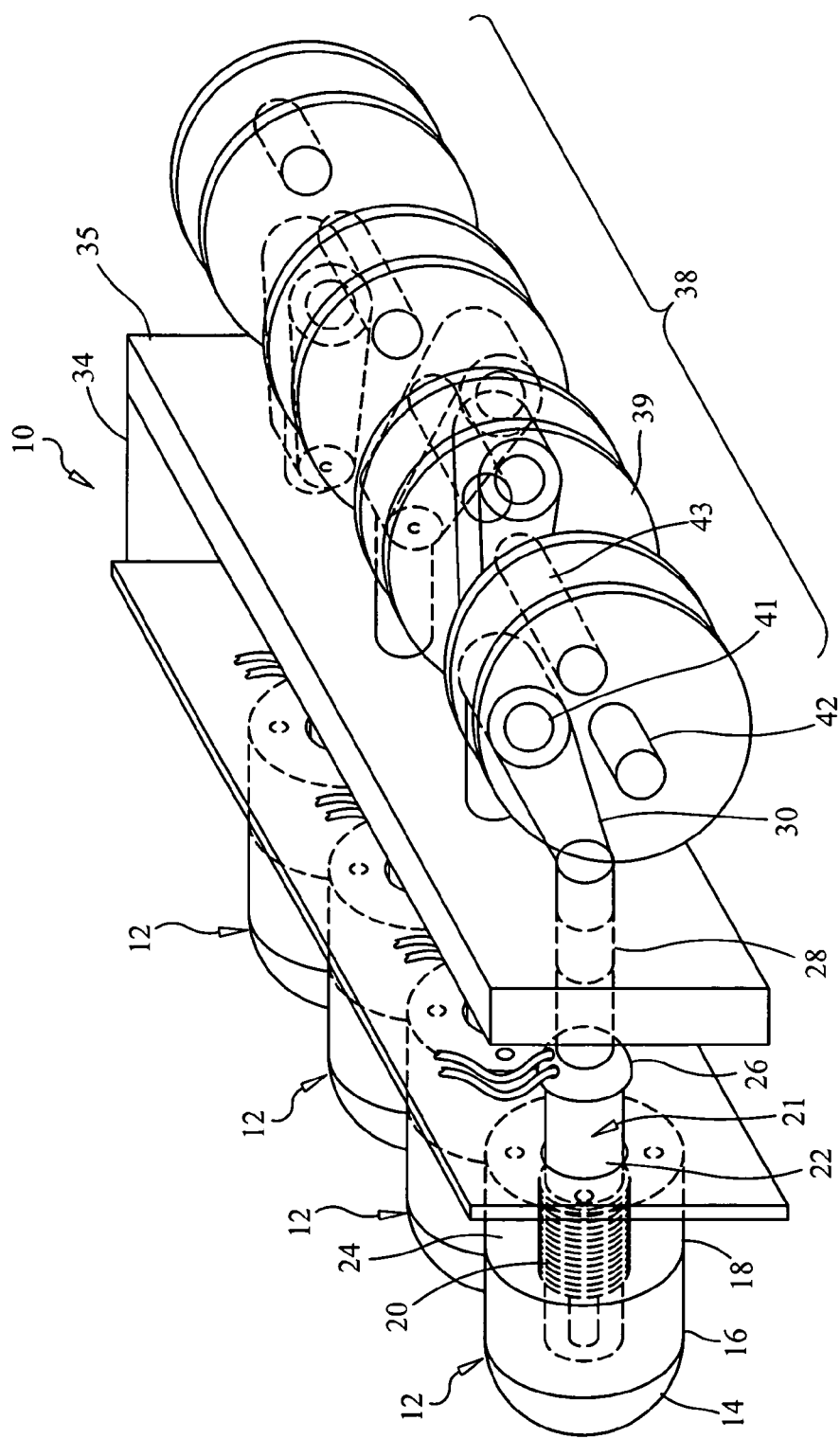
FIG. 1 is a perspective view of the preferred embodiment of the electric engine showing four drive mechanisms in accordance with the instant invention.
Figure 2:
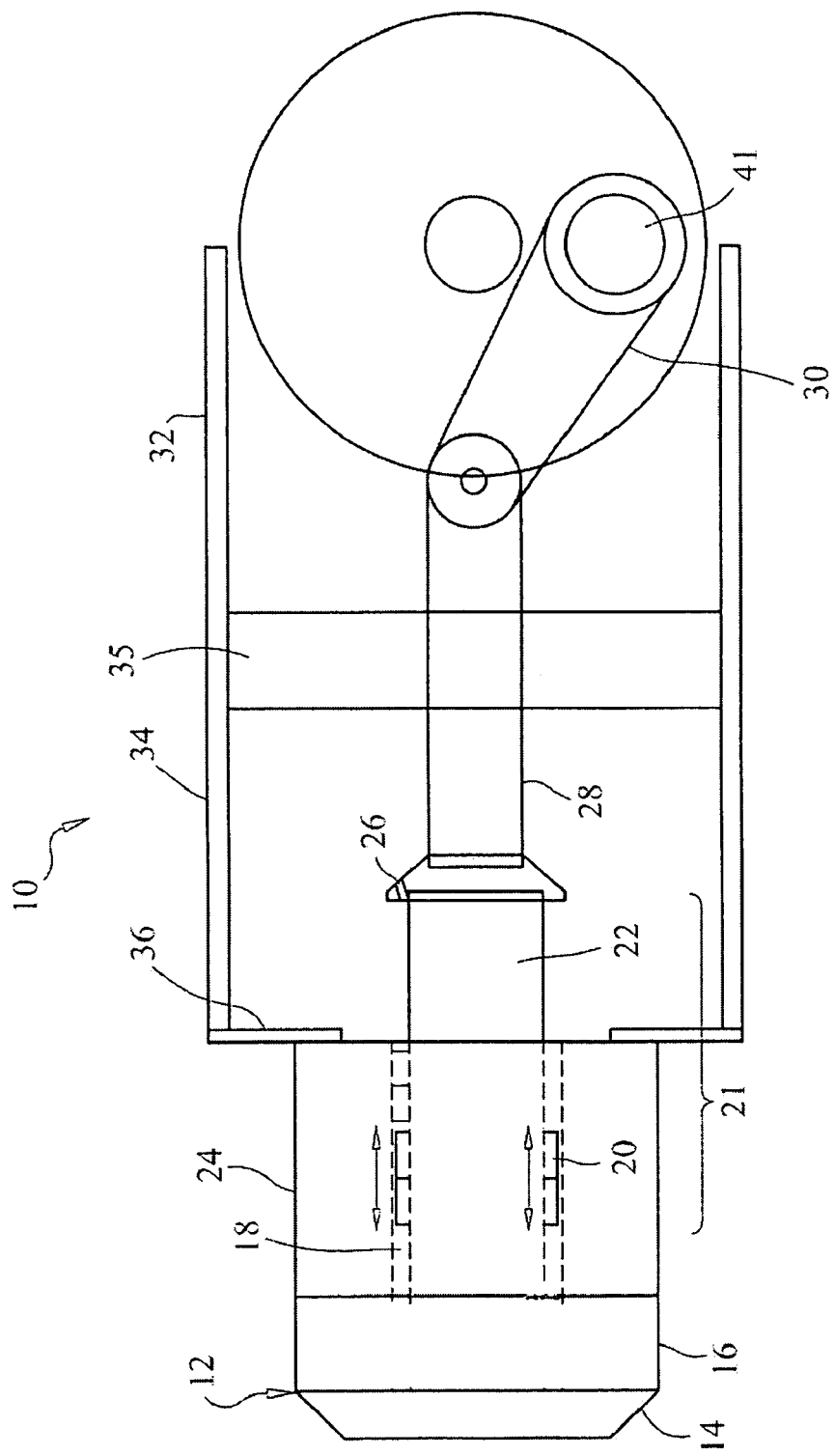
FIG. 2 is an elevational cut-away view of the preferred embodiment of the electric engine showing a drive mechanism in accordance with the instant invention.

With reference to the drawings, FIGS. 1 to 15 depict the preferred embodiment of the instant invention which is generally referenced as an electric engine and, or by numeric character 10. The electric engine 10 of the instant invention is designed for transportation vehicles using non-rotary electrically induced mechanics to provide torque to any and all axles or transmissions driven by the engine 10. The electric engine 10 preferably comprises four drive mechanisms 12 with piston coil systems 21 that fire ninety degrees (90°) apart as opposed to the conventional one hundred and eighty degrees (180°) or three hundred and sixty degrees (360°). In addition, the piston coil systems 21 do not require electricity to pull them back to their original position after firing. The piston coil systems 21 operate dependently, as opposed to independently, wherein the firing of one piston coil system 21 causes the previous piston coil system 21 to return to its original position.

With reference to FIGS. 1-15, the preferred embodiment of the electric engine 10 comprises four drive mechanisms 12, four piston coil systems 21 and four crank systems 27. Each drive mechanism 12 comprises a metallic T-yoke 14, ring-shaped magnet 16, metallic hollowed cylinder 18 and piston coil system 21. Each piston coil system 21 comprises a wire coil 20, coil ring/slab 22 and non-metallic spacer/coil-rod-connector 26. Each crank system 27 comprises a drive rod 28, crank rod 30, guide plate/rod guide 35, guide plate housing 34, crank system housing 32, non-metallic gasket 36 and crankshaft 38. For a four-cylinder engine, the crankshaft 38 comprises four crank system rod shaft 41, two end shafts 42, three mid shafts 43 and eight crankshaft dividers 39, which also act as balancers. The metallic T-Yoke 14 is attached to one end of the ring-shaped magnet 16 providing a stronger magnetic field inside the magnet. The metallic hollowed cylinder 18 is attached to the opposing end of the magnet 16 to provide a longer magnetic field over the area from the attachment point between the T-Yoke 14 and magnet 16, across the metallic hollowed cylinder/magnet 16/18 attaching point, to the opposing end of the metallic hollowed cylinder 18. The wire coil 20 is attached to the coil slab 22 in a predetermined proportion to the length from the T-Yoke/magnet attachment 14/16 to the opposing end of metallic hollowed cylinder 17 and in proportion to the diameter of the spatial area 24 between the inner portion of the T-Yoke 14 and the inner walls of the ring-shaped magnet 16 and metallic hollowed cylinder 18. The wire coil 20 and coil slab 22 are "seeded" in the spatial area 24. The wire coil 20 and coil slab 22 are not attached to the T-yoke 14, magnet 16 or cylinder 18 so that they slide freely in the spatial area 24 between the T-yoke 14 and in the metallic hollowed cylinder 18. The opposing end of the coil slab 22 is attached to the nonmetallic spacer/connector 26. The non-metallic spacer 26 is attached to the drive rod 28, which is pivotally attached to the crank rod 30 to transfer mechanical forces from the drive mechanism 12 to the crank rod 30. Each drive rod 28 passes through an aperture in the guide plate/rod guide 35 in the guide housing 34 to prevent the wire coil 20 or coil slab 22 from touching the inner portion of the T-Yoke 14 or the inner walls of the ring shaped magnet 16 or metallic hollowed cylinder 18. The guide housing 34 is attached to the crankshaft housing 32, which houses the crankshaft 38. The crank rod 30 is pivotally attached to the crank system rod shaft 41 inside the crankshaft housing 32. The other end of the guide housing 34 is attached to the non-metallic gasket 36, which is attached to the metallic hollowed cylinder 18.

To achieve the object of the invention, the crankshaft 38 has four crank system rod shafts 41 that deviate from the center of its rotational axis. The four rod shafts 41 deviate from each other in 90 degree intervals, allowing, in succession, the "firing" of the first to the fourth to complete one revolution on the crankshaft 38.

Figure 3:
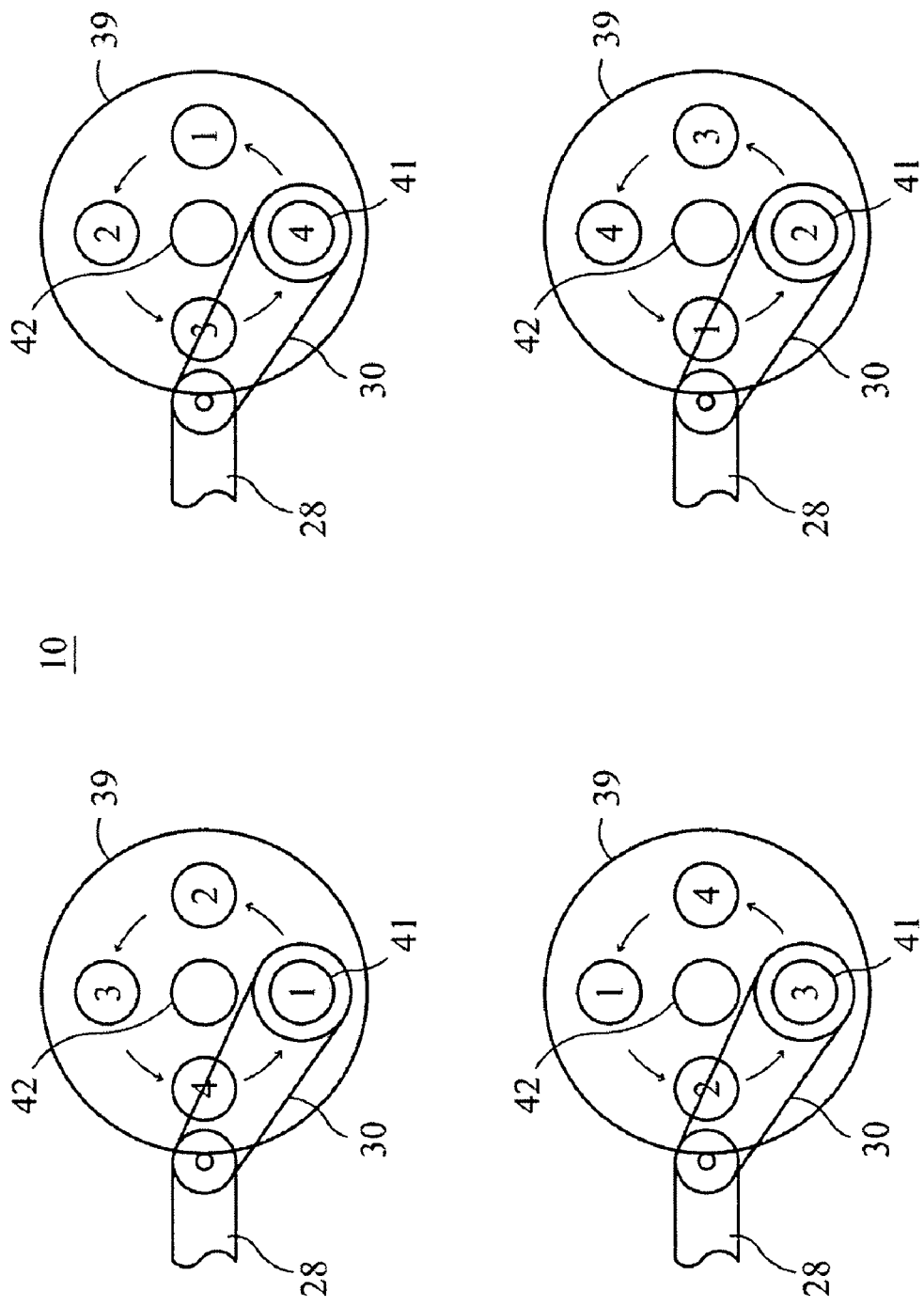
FIG. 3 is an partial elevational cut-away view of the preferred embodiment of the electric engine showing the four firing positions for four drive mechanisms in accordance with the instant invention.
Figure 4:
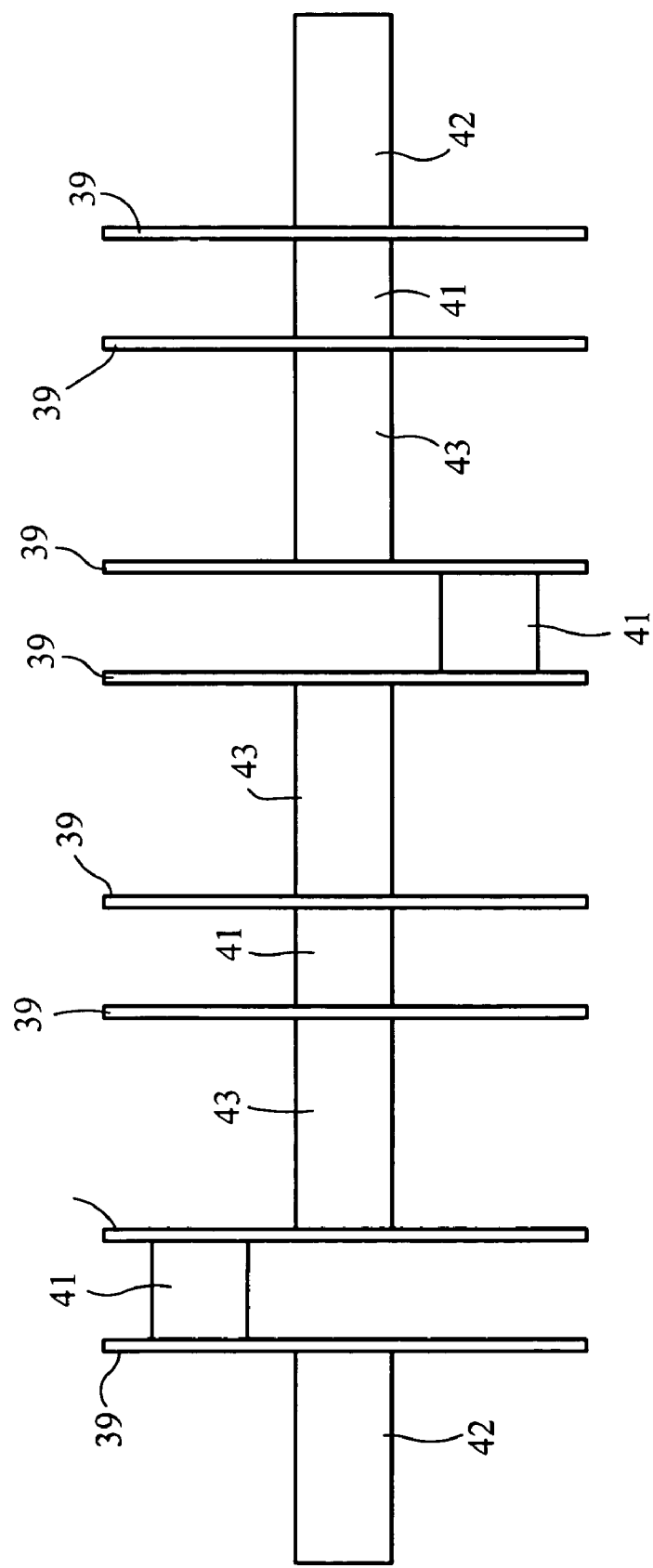
FIG. 4 is an elevational view of the preferred embodiment of the crankshaft for a four-cylinder electric engine in accordance with the instant invention.
Figure 5:
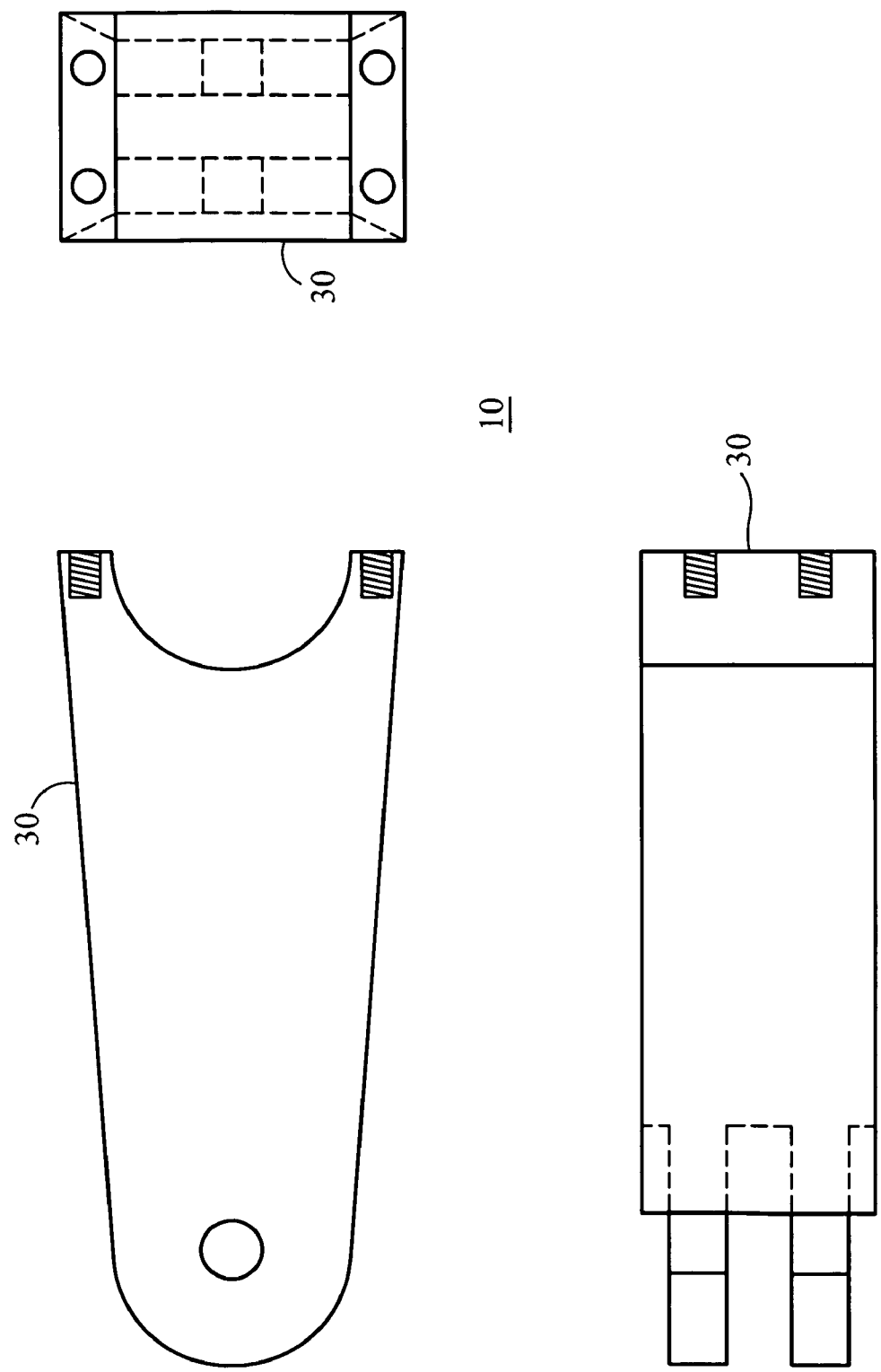
FIG. 5 shows side, top and front elevational views of the preferred embodiment of the crank rod of the electric engine in accordance with the instant invention.
Figure 6:
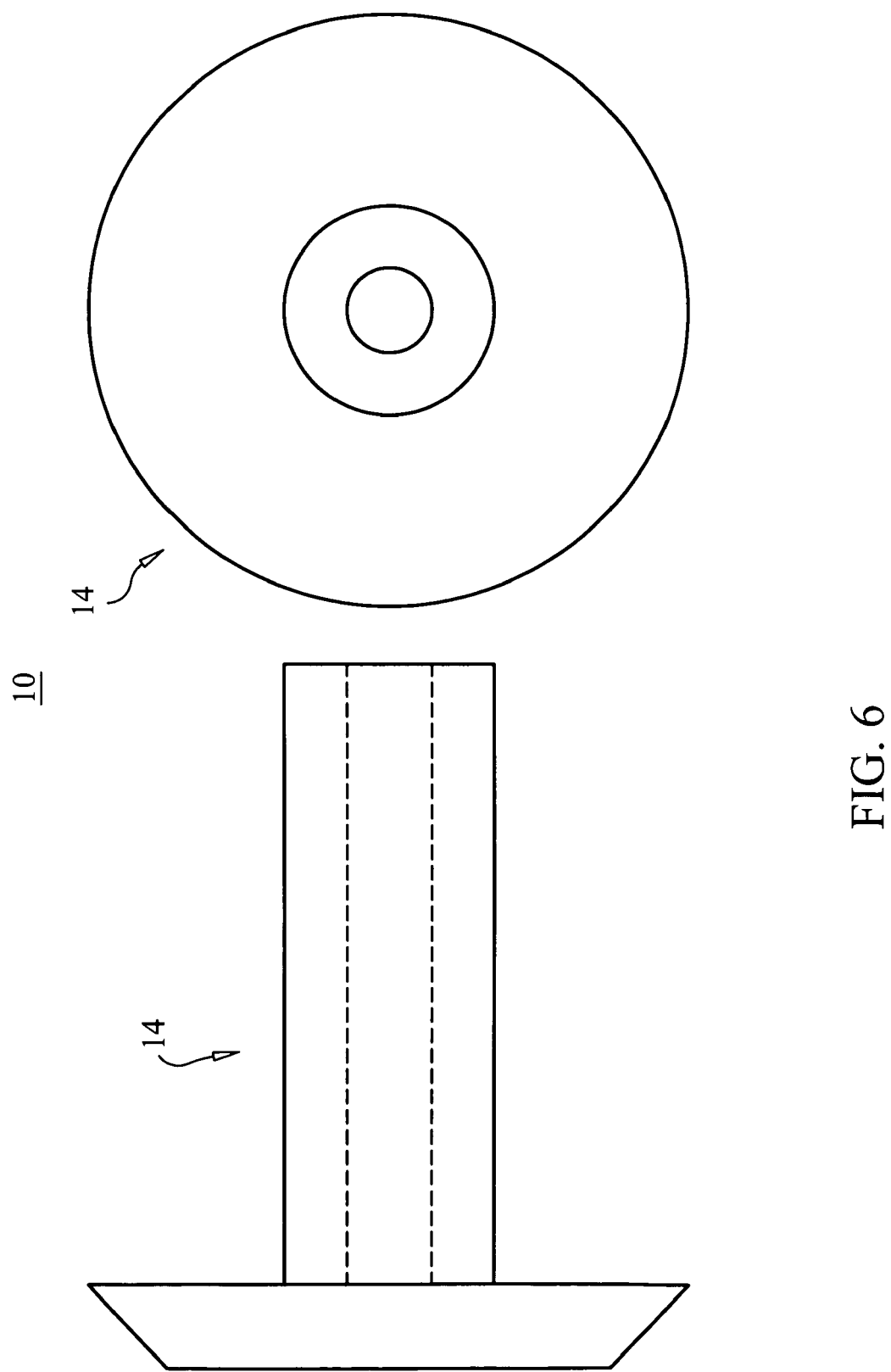
FIG. 6 shows side and front elevational views of the preferred embodiment of the metallic T-yoke of the electric engine in accordance with the instant invention.
Figure 7:
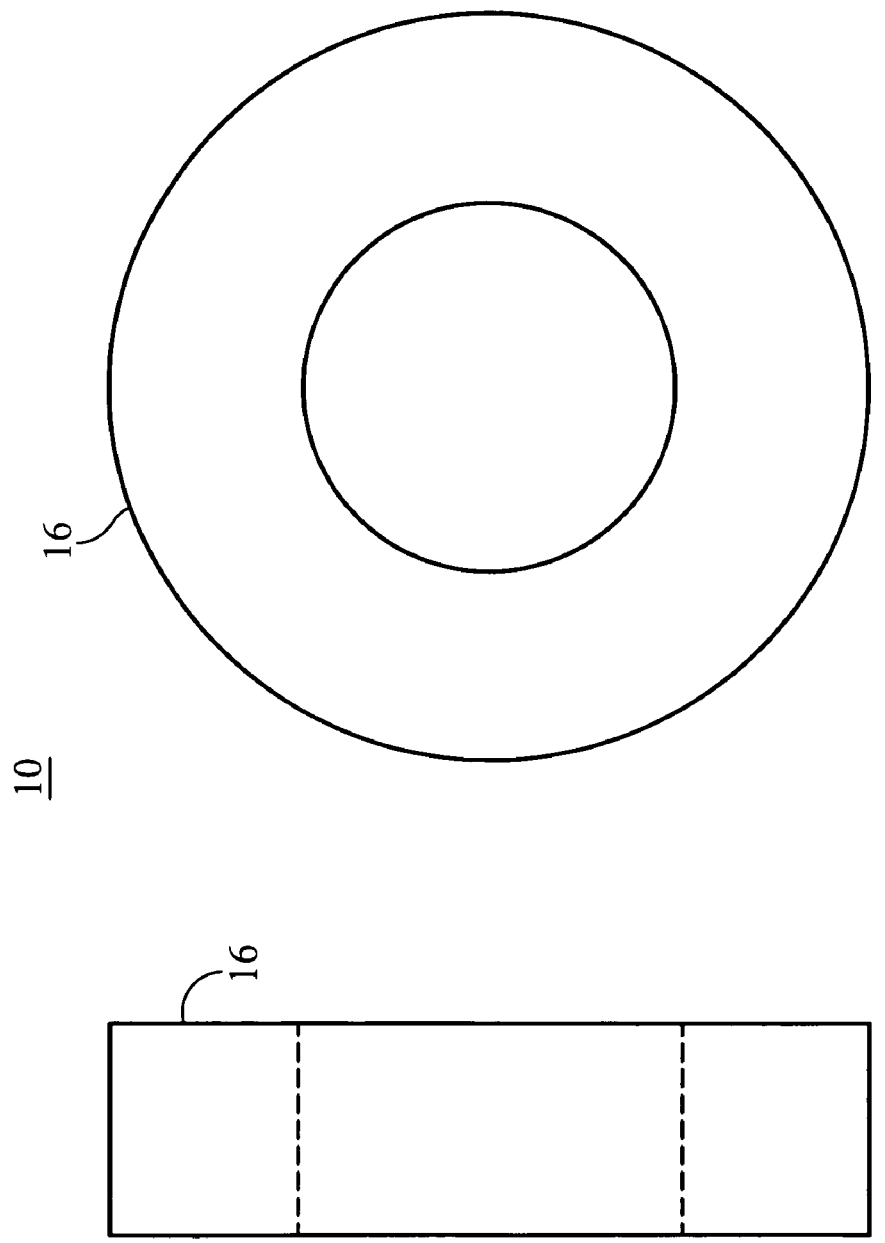
FIG. 7 shows side and front elevational views of the preferred embodiment of the ring-shaped magnet of the electric engine in accordance with the instant invention.
Figure 11:
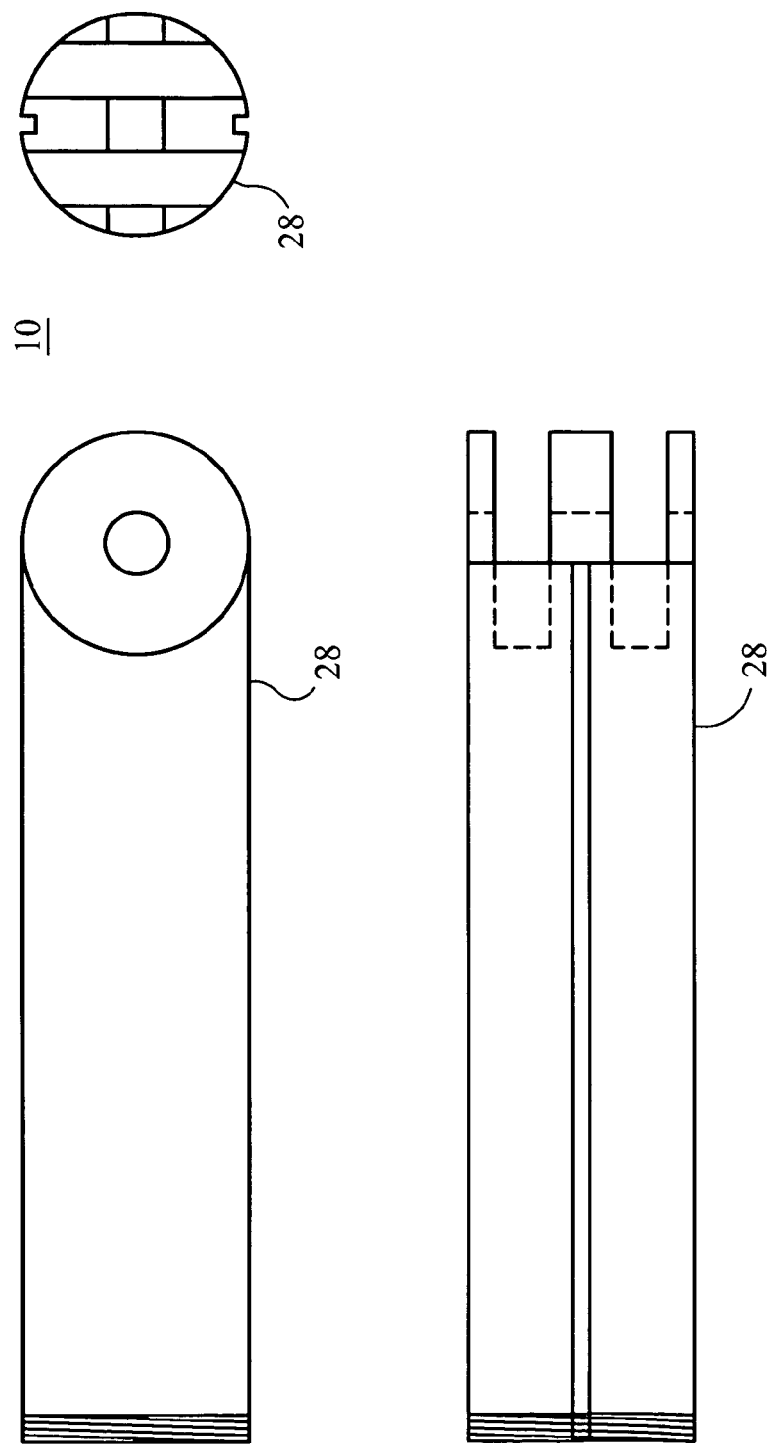
FIG. 11 shows side, top and front elevational views of the preferred embodiment of the coil rod of the electric engine in accordance with the instant invention.
Figure 12:
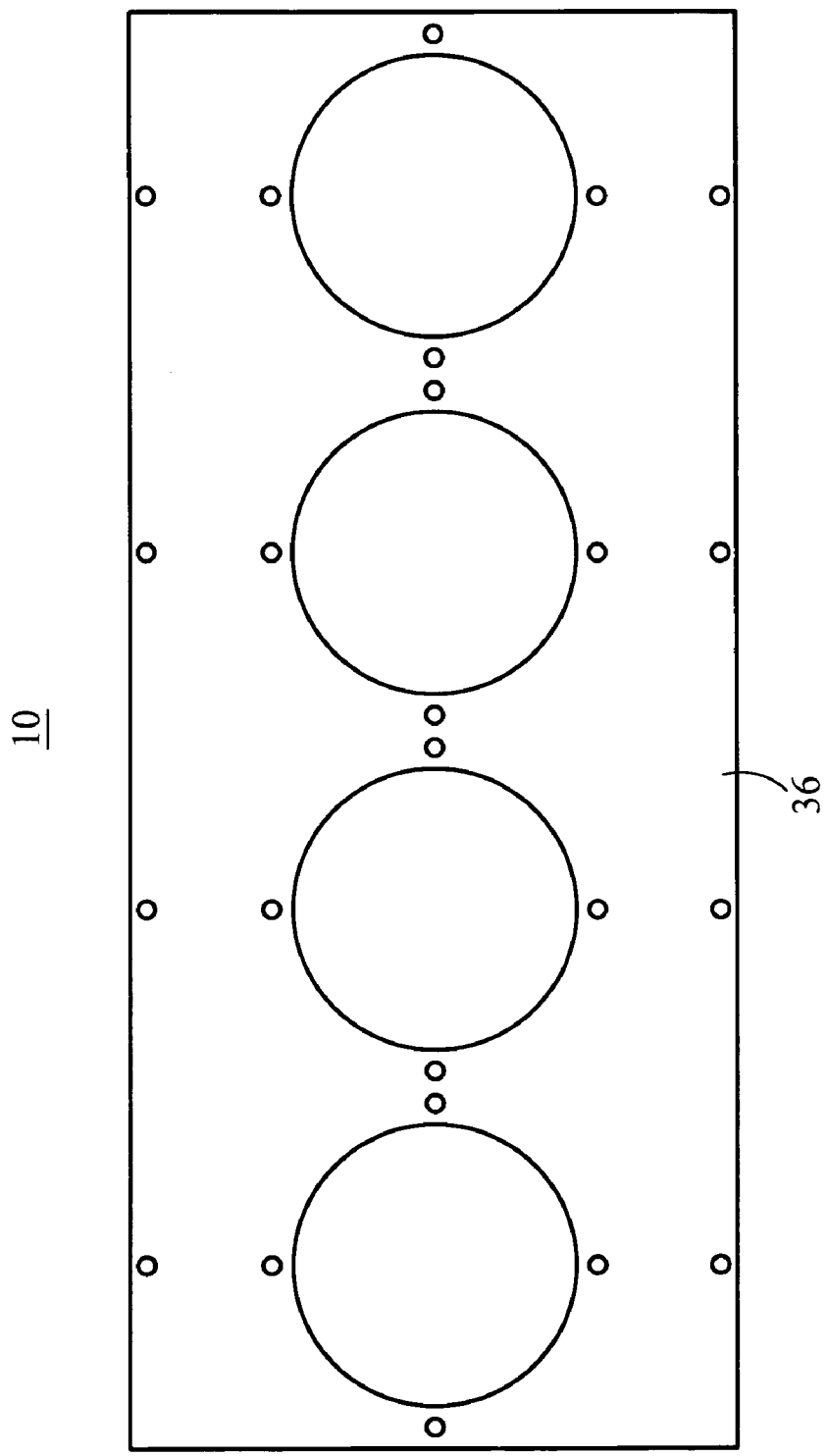
FIG. 12 shows top and front elevational views of the preferred embodiment of the crank house gasket of the electric engine in accordance with the instant invention.
Figure 13:
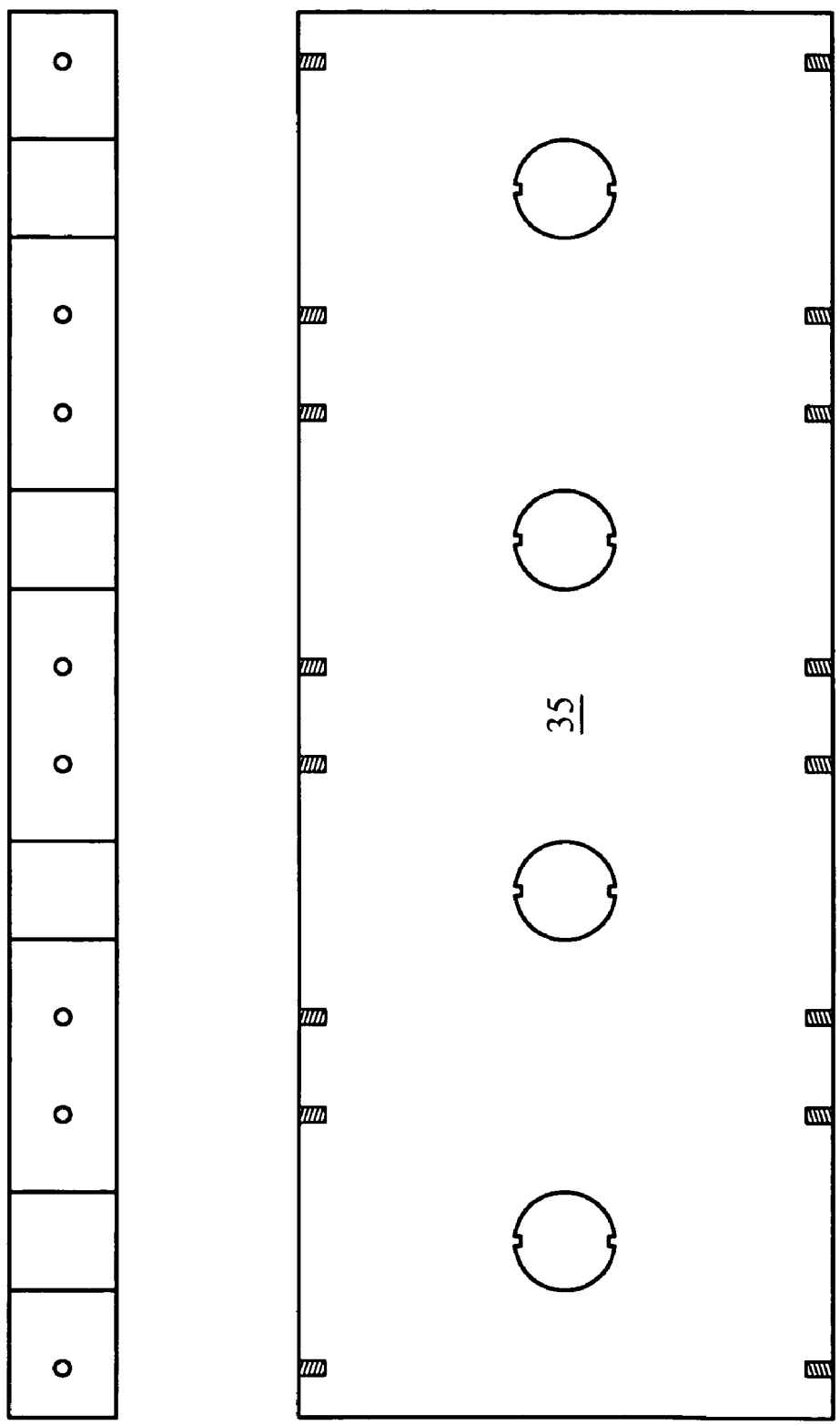
FIG. 13 shows top and front elevational views of the preferred embodiment of the rod-guide/guide-plate of the electric engine in accordance with the instant invention.
Figure 14:
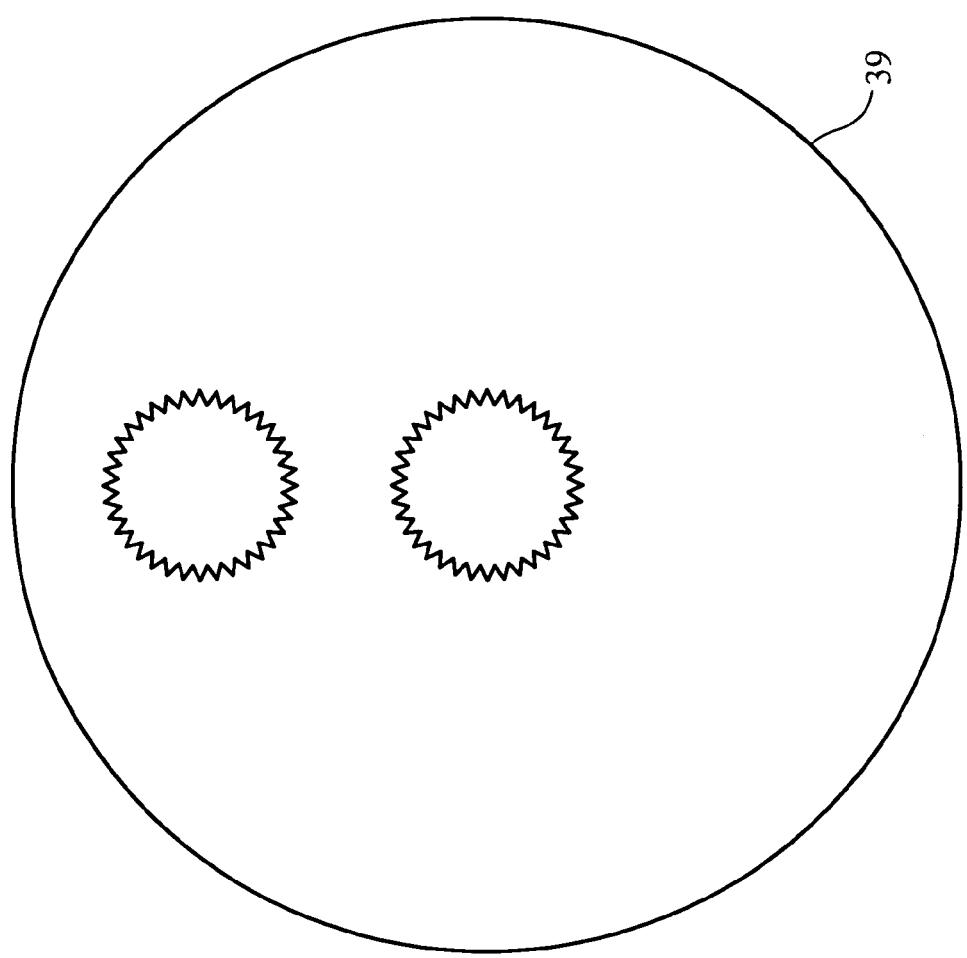
FIG. 14 shows side and front elevational views of the preferred embodiment of the crankshaft divider of the electric engine in accordance with the instant invention.
Figure 15:
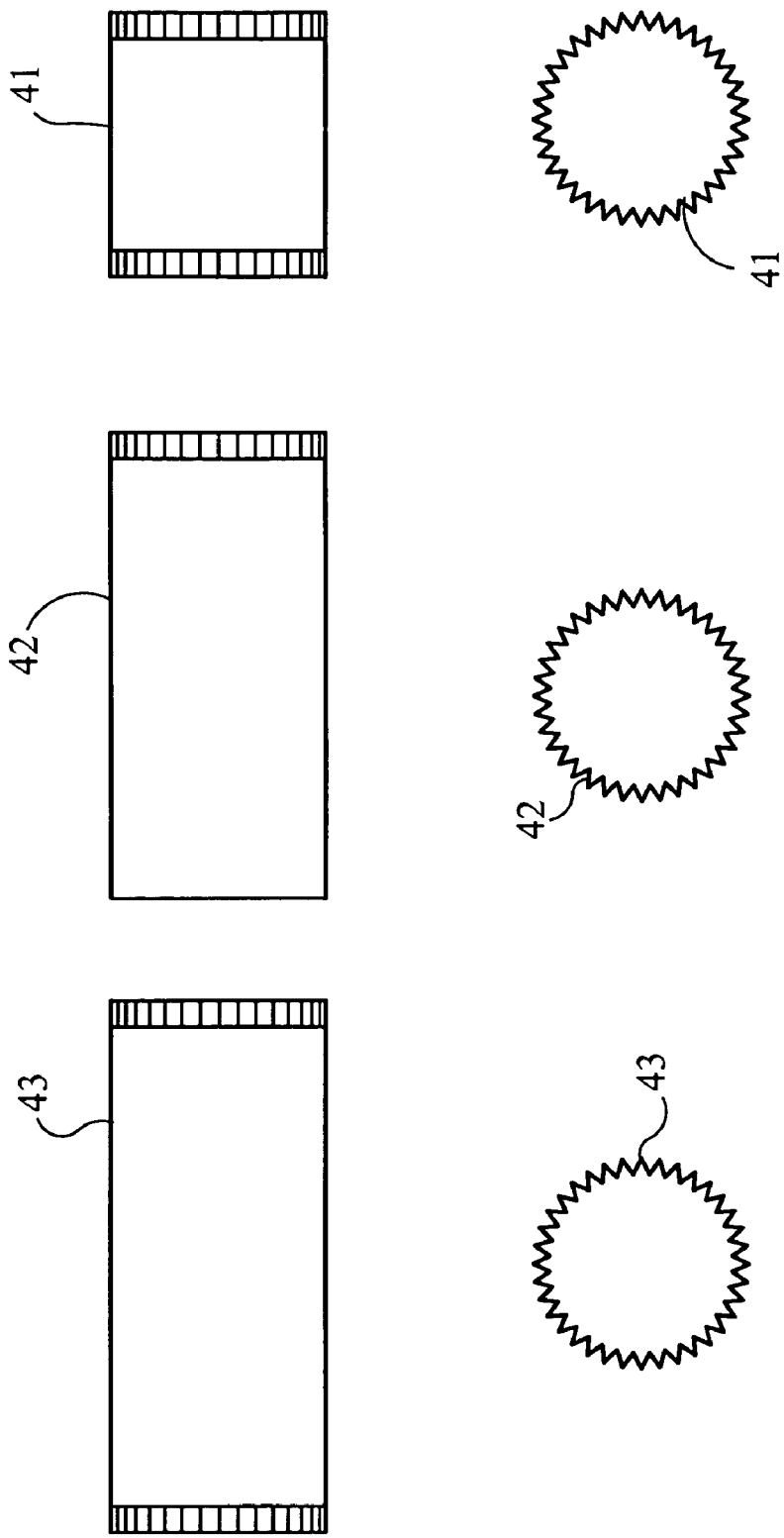
FIG. 15 shows front and top elevational views of the preferred embodiment of the crank system rod shaft, end shaft and mid shaft of the electric engine in accordance with the instant invention.

The engine 10 runs by applying electricity into the wire coil 20 to create a magnetic field. The timing of current through the wire coil 20 may be either mechanically, digitally or computer induced. The magnetic field created by the flow of current through the wire coil 20 repulses the magnetic field pre-existing from the metallic T-Yoke 14, ring shaped magnet 16 and metallic hollowed cylinder 18. This force of repulsion in the coil 20 pushes it away from its rest position in the spatial area 24 between the inner walls of metallic hollowed cylinder 18 and inner portion of the T-Yoke 14. This force is transformed and transferred through the coil slab 22, nonmetallic spacer 26, drive rod 28, crank rod 30 and crankshaft 38. This transferred force creates or imparts torque on the crankshaft 38 causing it to rotate 90 degrees or one-quarter revolution thereby aligning the next drive mechanism 12 into the firing position, as shown in FIG. 3. After all four driving mechanisms 12 have fired, the torque-bearing crankshaft 38 completes one revolution.

The instant invention has been shown and described herein in what is considered to be the most practical and preferred embodiment. It is recognized, however, that departures may be made therefrom within the scope of the invention and that obvious structural and/or functional modifications will occur to a person skilled in the art.

What is claimed is:

1. A torque harnessing electric engine comprising:
    four drive mechanisms, each said drive mechanism comprising a metallic yoke electrically connected to one end of a ring-shaped magnet and a metallic hollow cylinder attached to a second of said ring-shaped magnet;
    four piston coil systems comprising a piston coil system for each said drive mechanism wherein each said piston coil system fires ninety degrees (90°) apart with respect to at least one other said piston coil system and causes a previously fired piston coil system to return to an original position, said piston coil systems each comprising a wire slab, a wire coil wrapped around and attached to said wire coil slab in a predetermined proportion to the length from said yoke and magnet attachment point to said the opposing end of said cylinder, a spatial area defined between said yoke and said ring shaped magnet, said wire coil slab being suspended over a portion of said yoke so as to slide freely in said spatial area and a means for receiving and directing electric power to said wire coil; and
    a crank system for each said drive system operatively coupled to a corresponding piston coil system;
    each said metallic hollow cylinder circumventing a portion of a corresponding piston coil system to allow movement of said corresponding piston coil system and mechanically coupled to said crank system with a non-metallic gasket.

2. An electric engine as recited in claim 1, wherein said wire coil is attached to said coil slab in proportion to the diameter of said spatial area.

3. An electric engine as recited in claim 1, wherein said crank system comprises:
    a housing mechanically coupled to said non-metallic gasket at one end;
    each said crank system comprising:
        a drive rod in said housing operatively coupled to said coil slab by a non-metallic spacer;
        a drive rod guide connected to the interior surface of said housing having an aperture through which said drive rod passes for guiding said drive rod as it cycles to prevent said wire coil from touching said yoke or said cylinder;
        a crankshaft; and
        a crank rod in said housing pivotally connected to said drive rod at one end and pivotally connected to said crankshaft at a predetermined point.

4. An electric engine as recited in claim 3, wherein said crankshaft comprises:
    four pairs of crankshaft dividers, each said pair corresponding to one of said piston coil systems and drive mechanisms;
    each said divider pair comprising two plates connected to a drive shaft at its center with a predetermined spacing, a divider rod joining said plates and operatively coupled to said crank rod for rotating said plates and said drive shaft when said drive rod is caused to cycle by said drive mechanism and said piston coil system; and
    each said divider pair and divider rod being positioned so the divider rod for each divider pair is oriented ninety degrees (90°) from the divider rod for an adjacent divider pair.

5. An electric engine as recited in claim 1, wherein said yoke comprises a T-shape.

* * * * *